3,465,779
LIQUID PUMPING SYSTEMS
Jack Ronald Marsland, Newark, and Alexander Stirling Malloch, Newark-on-Trent, England, assignors to Worthington-Simpson Limited, Newark-on-Trent, England, a British company
Filed June 14, 1965, Ser. No. 463,843
Claims priority, application Great Britain, Aug. 25, 1964, 34,807/64
Int. Cl. G05d 11/00; F04b 21/00; F17c
U.S. Cl. 137—118     4 Claims

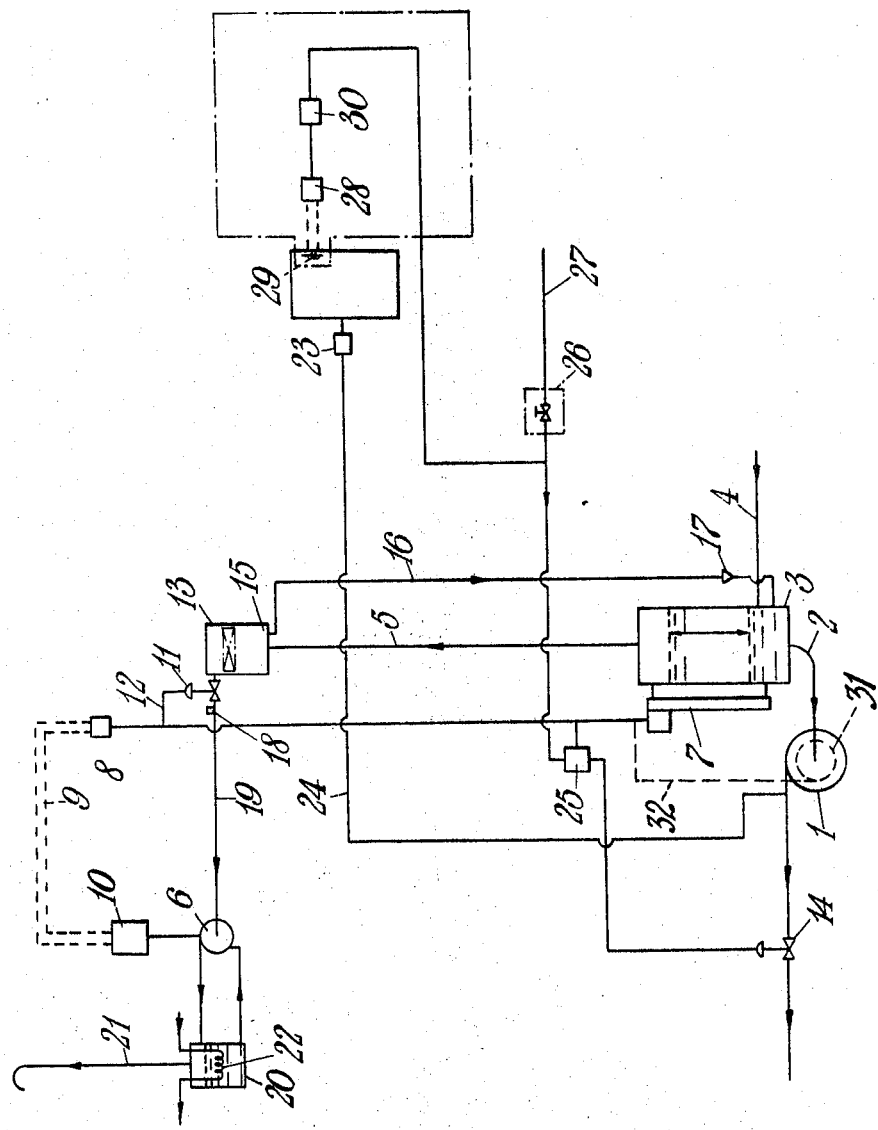

ABSTRACT OF THE DISCLOSURE

A system for installation in a tanker ship having liquid cargo tanks adapted to be stripped of liquid comprising a pump, a vapor separating chamber connected to the inlet side of the pump, a vacuum breaker operably related to the vapor separating chamber, and a device responsive to the diminishing level of liquid in the separating chamber successively to vent the chamber, operating means for withdrawal accumulated gas or air vapor from the separating chamber to maintain a working level of liquid therein and then to control the rate of discharge of the liquid from the separating chamber by the pump to maintain the level of liquid in the separating chamber above the pump inlet.

---

This invention relates to liquid pumping systems and more particularly cargo oil or ballast pumping systems for tanker ships. It has been devised with the general intention of providing an improved system, as compared with the conventional arrangements, which enables the liquid contents in the cargo and ballast compartments of tanker ships to be discharged automatically by the main centrifugal cargo pumps without fluctuation, at steady flow to a lower level than has hitherto been attainable other than by devious and unreliable manual operation or by the use of reciprocating stripping pumps.

According to the present invention therefore a liquid pumping system comprises a pump, a vapor separating chamber connected to the inlet side of the pump, means associated with the vapor separating chamber for releasing accumulated gas or air vapor from the vapor separating chamber to maintain a working level of liquid therein and means for controlling the rate of discharge of liquid from the vapor separating chamber by the pump to maintain the level of liquid in the vapor separating chamber above the pump inlet. This enables the pump to operate at a steady speed even during residual pumping or stripping periods when otherwise violent speed fluctuations tend to occur.

One particular and at present preferred embodiment of the invention for a tanker ship is diagrammatically illustrated in the accompanying drawing.

The drawing shows a cargo pump 1 with driving means and an inlet pipe 2 connected to the bottom of a vapor separating chamber 3 which is connected to the cargo tanks (not shown) by a feed pipe 4. The pipes 2 and 4 are not coaxial so as to enable gas and air bubbles to be separated from the liquid and released to the vapor space in the chamber 3. The chamber 3 could alternatively contain baffles to give this effect.

Gases and air are removed from the top of the chamber 3 via a pipe 5 by means of a vacuum pump 6 which is automatically stopped and started according to the conditions prevailing in the tank by the means later described.

Mounted beside the chamber 3 and coupled to it is a level controlled device 7 which is effective to stop and start the vacuum pump 6 by passing a pneumatic signal to pressure switches 8 installed in an electric circuit 9 which includes a vacuum pump starter 10. The vacuum pump 6 is started at a predetermined liquid level in the chamber 3 and stopped when the liquid level rises to a further predetermined level.

The level controlling device can also function by passing a different pneumatic signal, to control a diaphragm operated valve 11 in the vacuum pump suction pipe 19 to regulate air and gases drawn from the separator chamber 3 into the vacuum pump 6 after passing through an interceptor tank 13. The arrangement is that the valve 11 closes tightly should the liquid level in the separator chamber 3 rise rapidly and so prevents liquid being drawn into the vacuum pump 6. Valve 11 is openable by pneumatic operation and closes by spring action in the event of air failure.

The level controlling device 7 is also effective to operate by a pneumatic signal a control valve 14 in the cargo pump discharge line so that as the level of the separator chamber 3 falls this control valve 14 will throttle the discharge from the cargo pump 1 so that the discharge is regulated to coincide with the rate at which the liquid enters the separator chamber.

The control valve 14 is normally of the butterfly type operated by a pneumatic cylinder but any similarly operated valve could alternatively be employed. Whatever type of valve is used however it can also be hand operated by means of a manual/automatic panel loader positioned at the pump room entrance. In addition the valve can be locked in an open, shut or "stripping" position by means of a hand lever mounted directly upon the valve spindle.

Alternatively also the level controlling device 7 may be arranged to transmit a pneumatic signal as indicated by dash line 32 such as will reduce the speed of a cargo pump driving means 31 so that when there is a fall in level below a certain point in the separator chamber 3 the pumping rate is reduced to correspond with the rate of liquid entry to the separator chamber.

In the suction pipe 5 from the separator tank 3 there is installed immediately adjacent the diaphragm operated vapor release valve 11 the already mentioned interceptor tank 13 with removable filter which is for the purpose of preventing particles of liquid which may be entrained in the rising vapor from reaching the vacuum pump. The tank 13 is fitted with a moisture separator and together with the valve 11 is normally mounted at main deck level in the entrance to the pump room.

Any liquid which reaches the interceptor tank 13 is returned to the suction side of the separator chamber by a drain line 16 incorporating a nonreturn valve 17.

In order to prevent undue gasification of oil due to excessive vacuum in the vapor release lines in adjustable vacuum breaker or snifting valve 18 is fitted in the suction pipe 19 of the vacuum pump 6.

The air gases are discharged by the pump 6 into a further tank 20 together with the pump sealing water from the vacuum pump 6. In this tank 20 the gases separate from the water and pass from the top of the tank through a vent pipe 21 to atmosphere in a safe area normally at masthead height. In the tank 29 there is fitted a water cooling coil 22, the cooling medium being sea water from the ship's salt water main which passes through the coil and then overboard. Thus the pump sealing water in the tank 20 is kept at a reasonable temperature and can be recirculated through the vacuum pump 6.

By suitable valves and piping (not shown) the tank 20 can be drained to the cargo pump suction side or to the pump room bilge.

The system also includes a thermostat 23 fitted in the cargo pump discharge branch 24 so that in the event of the pump being left running on an empty tank for a prolonged period, causing the temperature of the liquid to rise, the thermostat switch, having been set to a predetermined temperature will stop the drive to the pump. The thermostat is connected to a solenoid valve (not shown) in the turbine or, if motor driven into the starter. If it is necessary to shut down the pump in an emergency this can be done from selected positions by isolating the air supply and venting the pneumatic signal lines.

Whereas in the presently described installation, the cargo pump 1 is electrically driven by a motor with a maximum power rating for pumping oil it is protected from overload when pumping sea water or higher viscosity oils by the application of an over-riding pneumatic signal to the discharge control valve 14 via a selector relay 25 so that the discharge valve is throttled, the quantity pumped therefore being reduced and the load on the motor being kept within permissable limits.

The over-riding signal is applied either by a hand-set air regulator 26 connected to an air supply line 27 or by means of an electro-pneumatic converter 28 which senses the motor current by means of a current transformer 29 and the current from the transformer is converted into a pneumatic signal. The pneumatic signal is then fed to the dischage control valve through a pneumatic controller 30 and the selector relay 25. The use of the selector relay 25 ensures that the discharge valve 14 will always take up the more closed position when indicated by the level controller 7 or the overload signal as the level control pneumatic signal is also fed into the selector relay 25 which selects the appropriate signal.

The sequence of operations as full cargo tanks are emptied is as follows:

At first the vacuum pump 6 is stationary, the vapor release valve 11 is shut and the discharge control valve 14 is open as the air signal pressure from the controlling device 7 is low and of the order of 3 p.s.i. The cargo pump 1 therefore operates normally. If vapor accumulates in the pump suction lines the level of liquid in the separator tank 3 is depressed and the air signal pressure from the controlling device 7 increases sufficiently to open the valve 11 to allow the vapor to pass, via interceptor chamber 13, to atmosphere, the level to rise again in tank 3 and the valve 11 to reclose.

As the level in the cargo tank drops to within a few feet of the bottom of the tank the accumulated air and gases in separator tank 3 again depress the liquid level and valve 11 is caused to open as before. Since it is possible that at this stage some air is being entrained the pneumatic signal pressure from controlling device 7 will be sufficiently high as to close switches 8 to cause the vacuum pump 6 to start and extract air and vapor and restore the liquid level in the separator tank 3. Pump 6 will run intermittently but as the level in the cargo tank gets very low air entrainment will result in continuous running of the pump 6 until the tank is empty.

As the level in the cargo tank reaches a stripping stage the flow into the strum will be inadequate to enable the pump to operate at full capacity and in consequence of a maximum signal pressure from the level controller 7, selector relay 25 will operate to cause progressive closure of discharge control valve 14 whilst at the same time the speed of pump 1 will be reduced.

The invention is also applicable where it is desired to retain separate stripping lines and separate stripping pumps to remove the residual liquid from ship's tanks after the bulk of the cargo has been discharged by the main pumps. The system would then be applied to separate centrifugal stripping pumps which will pump the residue from discharged tanks into one final tank and the contents of the final tank will be discharged ashore by means of one of the main cargo pumps which will also be fitted with the system according to the invention.

The vacuum pump or pumps are normally sited at main deck level in the pump room entrance, the driving motors, starters and pressure switches being mounted behind a gas-tight after bulkhead.

Alternatively the separate stripping pumps can be so designed that they are capable of discharging the residue ashore instead of into one of the ships tanks when fitted with a system according to the invention.

We claim:

1. A system for installation in a tanker vessel having liquid cargo tanks adapted to be stripped of liquid, comprising a motor driven pump having an inlet and an outlet, a discharge line communicating with the outlet, a vapor separating chamber to which liquid to be stripped is fed, said vapor separating chamber having an outlet connected to the inlet of the motor driven pump, a vacuum pump, a section line providing communication between the vacuum pump and the vapor separating chamber, said vacuum pump serving to extract vapor from the vapor separating chamber, and an interceptor chamber provided in said suction line intermediate said vapor separating chamber and said vacuum pump, a regulating valve for said suction line positioned between said interceptor chamber and said vacuum pump, an adjustable vacuum breaker in said suction line intermediate said regulating valve and said vacuum pump, a discharge tank provided with a vent, means operably connecting said discharge tank to said vacuum pump, a valve for said discharge line, means controlling the level of liquid in said vapor separating chamber, means for starting and stopping said vacuum pump, further means operably interrelating said level controlling means and said starting and stopping means operative to start said vacuum pump when the liquid in said vapor separating chamber is at a predetermined level and to stop said vacuum pump when the liquid rises to a further predetermined level, additional means operably related to said level controlling means and said regulating valve to open said regulating valve for allowing vapor to pass to said vacuum pump if vapor accumulates in the suction line between said vapor separation chamber and said interceptor chamber, and means operably related to said valve for said discharge line operative as the level of liquid in said vapor separating chamber falls to actuate said valve for said discharge line to throttle the liquid discharge via said motor driven pump to coincide with the rate at which liquid enters said vapor separating chamber.

2. The system as claimed in claim 1 in which said means for starting and stopping said vacuum pump includes a vacuum pump starter, an electric circuit therefor and at least one pressure switch for said circuit and said level controlling means including means for imparting a signal to said at least one pressure switch to actuate the same.

3. The system as claimed in claim 1 in which said valve in said discharge line is operable by a selector relay actuated by said level controlling means when said motor driven pump is subjected to an overload.

4. The system as claimed in claim 1 including means operably related to said motor driven pump for reducing the speed thereof upon the fall in liquid level in said vapor separating chamber so that the pumping rate corresponds to the rate at which liquid is fed into said vapor separating chamber.

References Cited

UNITED STATES PATENTS

| | | | |
|---|---|---|---|
| 1,866,064 | 7/1932 | Stratford | 103—113 |
| 2,044,443 | 6/1936 | Ott | 137—216.2 X |
| 2,073,676 | 3/1937 | Broderick | 236—9 |
| 2,306,841 | 12/1942 | Adams | 103—11 |
| 2,379,215 | 6/1945 | Brinkmann | 62—54 X |
| 2,409,024 | 10/1946 | Dornbrook | 137—215 X |
| 2,487,863 | 11/1949 | Garretson | 137—210 X |
| 2,813,594 | 11/1957 | Gantt | 37—118 X |
| 2,895,305 | 7/1959 | Reed | 62—54 |
| 3,099,254 | 7/1963 | Kerr | 137—30 X |
| 3,291,146 | 12/1966 | Walker | 137—30 X |

WILLIAM F. O'DEA, Primary Examiner

D. J. ZOBKIW, Assistant Examiner